US007402256B2

(12) United States Patent
Matsuzawa et al.

(10) Patent No.: US 7,402,256 B2
(45) Date of Patent: Jul. 22, 2008

(54) METHOD FOR PRODUCING LIQUID-JET HEAD

(75) Inventors: Akira Matsuzawa, Nagano-ken (JP); Mutsuhiko Ota, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 439 days.

(21) Appl. No.: 11/234,266

(22) Filed: Sep. 26, 2005

(65) Prior Publication Data

US 2006/0064873 A1 Mar. 30, 2006

(30) Foreign Application Priority Data

Sep. 27, 2004 (JP) ............................ 2004-280398

(51) Int. Cl.
*G01D 15/00* (2006.01)
*G11B 5/127* (2006.01)

(52) U.S. Cl. .......................... 216/27; 438/21; 29/890.1

(58) Field of Classification Search .................. 216/27; 438/21; 29/890.1

See application file for complete search history.

(56) References Cited

U.S. PATENT DOCUMENTS 6,758,554 B2 * 7/2004 Kamei et al. .................. 347/70
2004/0134881 A1 * 7/2004 Shimada et al. ............... 216/27

FOREIGN PATENT DOCUMENTS

JP 2003-159801 A 6/2003

* cited by examiner

*Primary Examiner*—Roberts Culbert
(74) *Attorney, Agent, or Firm*—Sughrue Mion, PLLC

(57) ABSTRACT

A method for producing a liquid-jet head comprises the steps of: forming a vibration plate and piezoelectric elements on one surface of a passage-forming substrate, and removing the vibration plate in a region to be a communicating portion, thereby forming an exposed portion; forming a wiring layer on the passage-forming substrate within the exposed portion, and forming lead electrodes; bonding a reservoir forming plate to the one surface of the passage-forming substrate; wet-etching the passage-forming substrate at the other surface thereof to form pressure generating chambers and the communicating portion; forming a liquid-resistant protective film on inner surfaces of the pressure generating chambers and the communicating portion; removing the protective film within the exposed portion; and performing wet etching on the communicating portion side to remove the wiring layer, thereby establishing communication between a reservoir portion and the communicating portion.

10 Claims, 7 Drawing Sheets

METHOD FOR PRODUCING LIQUID-JET HEAD

BACKGROUND OF THE INVENTION

1. Field of the Invention

This invention relates to a method for producing a liquid-jet head for jetting a liquid. More particularly, the invention relates to a method for producing an ink-jet recording head for ejecting ink as a liquid.

2. Description of the Related Art

Among ink-jet recording heads, as liquid-jet heads, there is, for example, one comprising:

a passage-forming substrate which has, formed therein, pressure generating chambers communicating with nozzle orifices, and a communicating portion communicating with the pressure generating chambers; piezoelectric elements formed on one surface of the passage-forming substrate; and a reservoir forming plate bonded to the surface of the passage-forming substrate where the piezoelectric elements are located, and having a reservoir portion constituting a part of a reservoir together with the communicating portion, and wherein the reservoir portion and the communicating portion are brought into communication via a penetrated portion penetrating a vibration plate and a lamination film provided on the vibration plate to form the reservoir (see, for example, Japanese Patent Application Laid-Open No. 2003-159801 (FIGS. 7 to 8); hereinafter referred to as Patent Document 1). Concretely, portions of the vibration plate and the lamination film, which are opposed to the communicating portion (reservoir portion), are mechanically punched to form the penetrated portion for establishing communication between the reservoir portion and the communicating portion.

However, the formation of the penetrated portion by such mechanical processing poses the problem that foreign matter, such as processing swarf, occurs and enters the passages such as the pressure generating chambers, causing trouble such as ejection failure. After formation of the penetrated portion, cleaning, for example, is performed, whereby the foreign matter such as processing swarf can be removed to some degree, but is difficult to be removed completely. Mechanical processing for creation of the penetrated portion also involves the problem that cracks occur around the penetrated portion, thereby resulting in ejection failure. That is, if ink is filled in the presence of the cracks and ejected through the nozzle orifices, flakes come off the cracked sites, and clog the nozzle orifices, causing ejection failure.

The above-mentioned Patent Document 1 discloses a structure, in which a coating film comprising a resin material fixes the lamination film for preventing the occurrence of foreign matter, in an attempt to solve the above-described problems. The adoption of this structure may suppress the occurrence of foreign matter to some extent, but poses difficulty in completely preventing ejection failure due to foreign matter.

Within the so formed passages, such as the reservoir,a protective film comprising a material having ink resistance is generally formed in order to protect the passage-forming substrate, etc. from erosion by ink. If such a protective film is formed in the above-mentioned structure provided with the coating film, the protective film is placed on the coating film. The protective film formed on the coating film comprising the resin material has poor adhesion to the resin material. Thus, the protective film is apt to peel off, and the peelings are likely to clog the nozzles.

Such problems are present not only in a method for producing an ink-jet recording head for ejecting ink, but also in a method for producing other liquid-jet head for ejecting a liquid other than ink.

SUMMARY OF THE INVENTION

The present invention has been accomplished in the light of the above-described circumstances. It is an object of the invention to provide a method for producing a liquid-jet head which can reliably prevent ejection failure due, for example, to nozzle clogging caused by foreign matter.

A first aspect of the present invention for attaining the above object is a method for producing a liquid-jet head, comprising the steps of: forming piezoelectric elements, each of which consists of a lower electrode, a piezoelectric layer, and an upper electrode, on one surface of a passage-forming substrate via a vibration plate, the passage-forming substrate being to have, formed therein, pressure generating chambers communicating with nozzle orifices for ejection of a liquid, and a communicating portion communicating with the pressure generating chambers, and removing the vibration plate in a region for serving as the communicating portion to form an exposed portion where the surface of the passage-forming substrate is exposed; forming a wiring layer on the surface of the passage-forming substrate on a side of the piezoelectric elements, also forming the wiring layer on the passage-forming substrate within the exposed portion, and patterning the wiring layer in a region corresponding to the piezoelectric elements to form lead electrodes leading from the piezoelectric elements; bonding a reservoir forming plate to the one surface of the passage-forming substrate, the reservoir forming plate having, formed therein, a reservoir portion communicating with the communicating portion and constituting a part of a reservoir; wet-etching the passage-forming substrate at another surface thereof until the vibration plate and the wiring layer within the exposed portion are exposed to form the pressure generating chambers and the communicating portion; forming a protective film comprising a material having liquid resistance on inner surfaces of the pressure generating chambers and the communicating portion; removing the protective film provided on the wiring layer within the exposed portion; and performing wet etching on a side of the communicating portion to remove the wiring layer, thereby establishing communication between the reservoir portion and the communicating portion.

In the first aspect, when the reservoir portion and the communicating portion are brought into communication, foreign matter such as processing swarf does not occur. Thus, ejection failure, for example, due to nozzle clogging caused by processing swarf is reliably prevented. In establishing communication between the reservoir portion and the communicating portion, moreover, the protective film does not impede etching of the wiring layer, and the wiring layer is reliably removed, successfully resulting in the communication. Furthermore, the protective film is not formed, for example, in a surplus region on wiring provided on the outer surface of the reservoir forming plate. Thus, the event that the protective film falls off to cause ejection failure due to nozzle clogging or the like can be prevented, and the drive IC, etc. can be reliably mounted on the reservoir forming plate. Besides, the etching solution for etching of the passage-forming substrate can be prevented from wandering to reach the reservoir forming plate, so that damage to the reservoir forming plate by the etching solution can be avoided.

A second aspect of the present invention is the method for producing a liquid-jet head according to the first aspect, wherein in the step of removing the protective film, a release layer whose internal stress is compressive stress is formed on the protective film, and the release layer is removed, whereby the protective film provided on the wiring layer within the exposed portion is removed.

In the second aspect, the protective film provided on the wiring layer within the exposed portion can be removed easily and reliably by the release layer.

A third aspect of the present invention is the method for producing a liquid-jet head according to the second aspect, wherein the internal stress of the release layer is 80 MPa or more.

In the third aspect, the protective film provided on the wiring layer within the exposed portion can be removed easily and reliably by the use of the release layer having predetermined stress.

A fourth aspect of the present invention is the method for producing a liquid-jet head according to the second or third aspect, wherein adhesion between the release layer and the protective film is greater than adhesion between the protective film and the wiring layer.

In the fourth aspect, the use of the release layer, whose adhesion to the protective film is higher than adhesion between the protective film and the wiring layer, enables the protective film provided on the wiring layer within the exposed portion to be removed easily and reliably.

A fifth aspect of the present invention is the method for producing a liquid-jet head according to any one of the second to fourth aspects, wherein titanium-tungsten (TiW) is used as a material for the release layer.

In the fifth aspect, since titanium-tungsten is used as the material for the release layer, the release layer having compressive stress as internal stress can be formed easily. Thus, the protective film provided on the wiring layer within the exposed portion can be removed easily and reliably.

A sixth aspect of the present invention is the method for producing a liquid-jet head according to any one of the first to fifth aspects, wherein gold (Au) is used as a material for the wiring layer.

In the sixth aspect, since gold (Au) is used as the material for the wiring layer, the wiring layer can be prevented from being penetrated by wet etching, when the pressure generating chambers and the communicating portion are formed in the passage-forming substrate by the wet etching. Also, the lead electrodes can be formed satisfactorily.

A seventh aspect of the present invention is the method for producing a liquid-jet head according to any one of the first to sixth aspects, wherein said wiring layer is composed of an adhesion layer and a metal layer formed via the adhesion layer.

In the seventh aspect, the wiring layer can be formed reliably on the vibration plate and the passage-forming substrate within the exposed portion. Also, the lead electrodes can be formed satisfactorily.

An eighth aspect of the present invention is the method for producing a liquid-jet head according to the seventh aspect, further comprising a step of light-etching a surface of the wiring layer exposed to the communicating portion before the step of forming the protective film.

In the eight aspect, the adhesion layer and the metal layer having the adhesion layer diffused therein can be removed by light-etching the wiring layer. Thus, adhesion between the wiring layer and the protective film can be weakened, facilitating the removal of the protective film provided on the wiring layer within the exposed portion.

A ninth aspect of the present invention is the method for producing a liquid-jet head according to any one of the first to eighth aspects, wherein an oxide or a nitride is used as a material for the protective film.

In the ninth aspect, the inner surfaces of the pressure generating chambers and the communicating portion can be reliably prevented from being eroded by the supplied liquid.

A tenth aspect of the present invention is the method for producing a liquid-jet head according to any one of the first to ninth aspects, wherein tantalum oxide is used as a material for the protective film.

In the tenth aspect, the inner surfaces of the pressure generating chambers and the communicating portion can be reliably prevented from being eroded by the supplied liquid.

BRIEF DESCRIPTION OF THE DRAWINGS

For a more complete understanding of the present invention and the advantages thereof, reference is now made to the following descriptions in conjunction with the accompanying drawings.

DESCRIPTION OF THE PREFERRED EMBODIMENTS

The present invention will now be described in detail based on the embodiments offered below.

Embodiment 1

Figure 1:
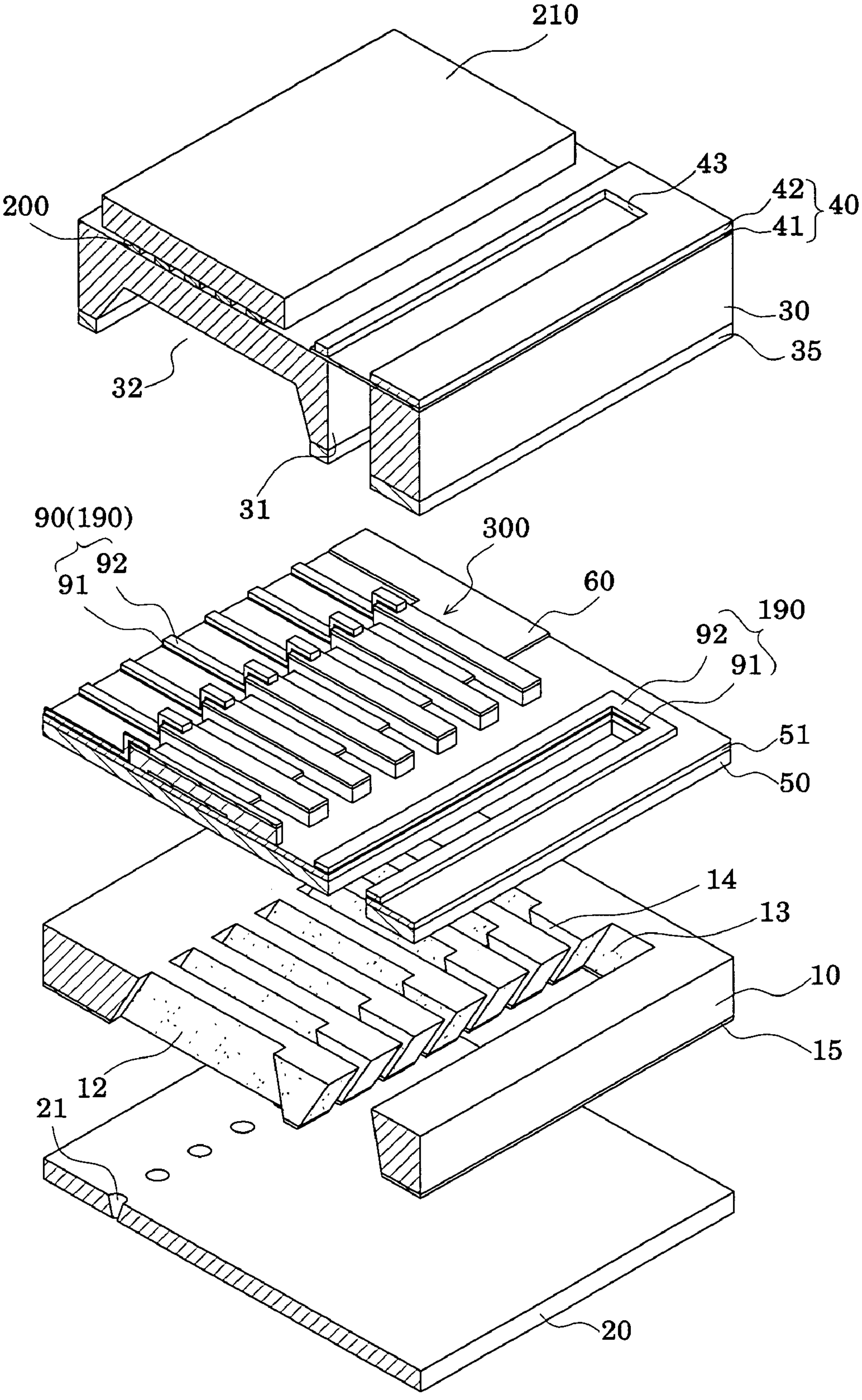
FIG. 1 is an exploded perspective view of a recording head according to Embodiment 1.
Figure 2A:
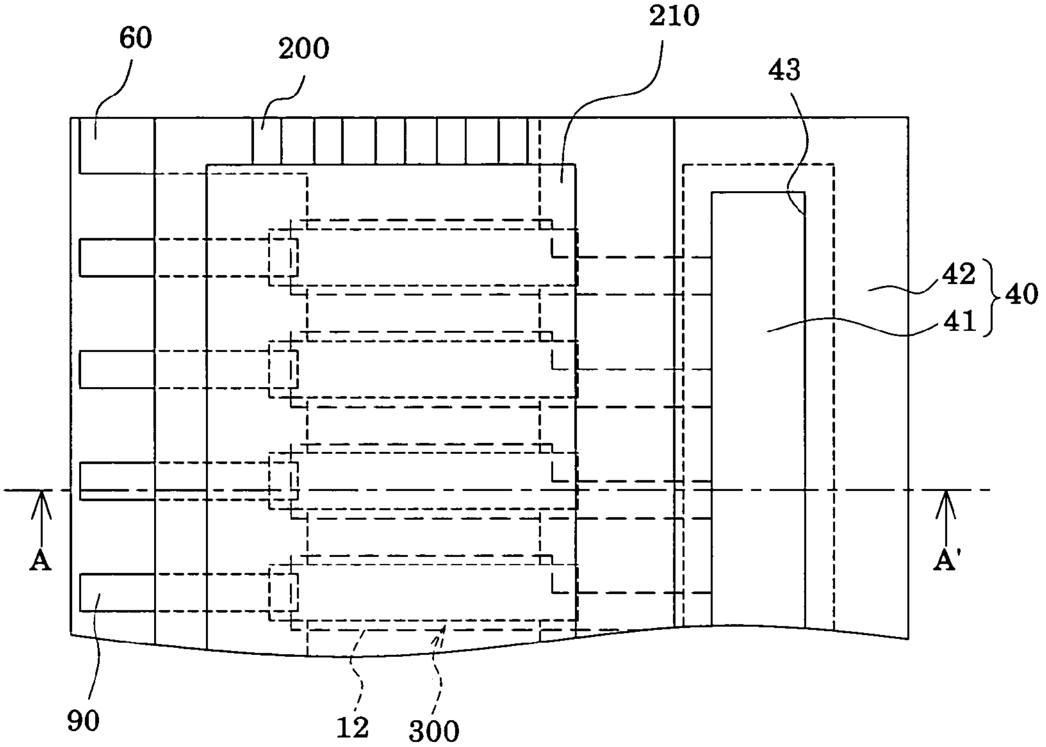
FIGS. 2A and 2B are, respectively, a plan view and a sectional view of the recording head according to Embodiment 1.
Figure 2B:
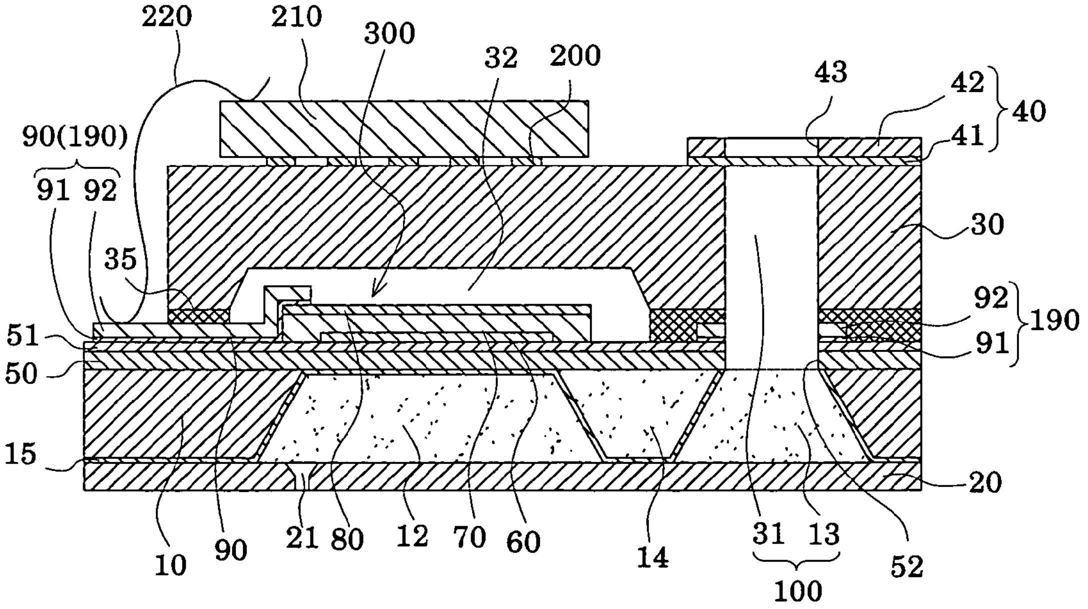

FIG. 1 is an exploded perspective view showing an ink-jet recording head which is produced by the manufacturing method according to Embodiment 1 of the present invention. FIG. 2A and FIG. 2B are a plan view and a sectional view, respectively, of the ink-jet recording head in FIG. 1. As shown in the drawings, a passage-forming substrate 10, in the present embodiment, consists of a single crystal silicon substrate having a plane (110) of the plane orientation. An elastic film 50 comprising silicon dioxide and having a thickness of 0.5 to 2 μm, formed beforehand by thermal oxidation, is present on one surface of the passage-forming substrate 10.

In the passage-forming substrate 10, a plurality of pressure generating chambers 12 are disposed parallel in the width direction of the passage-forming substrate 10. A communicating portion 13 is formed in a region longitudinally outwardly of the pressure generating chambers 12 in the passage-forming substrate 10. The communicating portion 13 and each of the pressure generating chambers 12 are brought into communication via an ink supply path 14 provided for each of the pressure generating chambers 12. The communicating portion 13 communicates with a reservoir portion 31 of a reservoir forming plate 30 (to be described later) to constitute a reservoir 100 serving as a common ink chamber for the respective pressure generating chambers 12. The ink supply path 14 is formed with a narrower width than that of the pressure generating chamber 12, and keeps constant the passage resistance of ink flowing from the communicating portion 13 into the pressure generating chamber 12.

On the inner wall surface of each of the pressure generating chambers 12, the communicating portion 13, and the ink supply paths 14 in the passage-forming substrate 10, a protective film 15 comprising a material having ink resistance, for example, tantalum oxide, such as tantalum pentoxide ($Ta_2O_5$), is provided in a thickness of about 50 nm. The ink resistance, herein, refers to resistance to etching with an alkaline ink. In the present embodiment, the protective film 15 is also provided on a surface of the passage-forming substrate 10 where the pressure generating chambers 12 are open, namely, on a bonding surface of the passage-forming substrate 10 to which a nozzle plate 20 is bonded. It goes without saying that the protective film 15 need not be provided in such a region, because ink substantially does not contact the bonding surface.

The material for the protective film 15 is not limited to tantalum oxide and, depending on the pH value of the ink used, zirconium oxide ($ZrO_2$), nickel (Ni) or chromium (Cr), for example, may be used as the material.

Onto the surface of the passage-forming substrate 10 where the protective film 15 has been formed, the nozzle plate 20 having nozzle orifices 21 bored therein is secured by an adhesive agent or a heat sealing film. The nozzle orifices 21 communicate with a zone near the end of the pressure generating chambers 12 on the side opposite to the liquid supply paths 14. The nozzle plate 20 comprises a glass ceramic, a single crystal silicon substrate, or stainless steel having a thickness of, for example, 0.01 to 1 mm, and a linear expansion coefficient of, for example, 2.5 to 4.5 [$\times 10^{-6}/°$ C.] at 300° C. or below.

On the surface of the passage-forming substrate 10 opposite to the nozzle plate 20, the elastic film 50 having a thickness, for example, of about 1.0 μm is formed, as described above. An insulation film 51 having a thickness, for example, of about 0.4 μm is formed on the elastic film 50. On the insulation film 51, a lower electrode film 60 with a thickness, for example, of about 0.2 μm, a piezoelectric layer 70 with a thickness, for example, of about 1.0 μm, and an upper electrode film 80 with a thickness, for example, of about 0.05 μm are formed in a laminated state by a process (to be described later) to constitute a piezoelectric element 300. The piezoelectric element 300 refers to a portion including the lower electrode film 60, the piezoelectric layer 70, and the upper electrode film 80. Generally, one of the electrodes of the piezoelectric element 300 is used as a common electrode, and the other electrode and the piezoelectric layer 70 are constructed for each pressure generating chamber 12 by patterning. A portion, which is composed of any one of the electrodes and the piezoelectric layer 70 that have been patterned, and which undergoes piezoelectric distortion upon application of voltage to both electrodes, is called a piezoelectric active portion. In the present embodiment, the lower electrode film 60 is used as the common electrode for the piezoelectric elements 300, while the upper electrode film 80 is used as an individual electrode of each piezoelectric element 300. However, there is no harm in reversing their usages for the convenience of the drive circuit or wiring. In either case, it follows that the piezoelectric active portion is formed for each pressure generating chamber. Herein, the piezoelectric element 300 and a vibration plate, where displacement occurs by a drive of the piezoelectric element 300, are referred to collectively as a piezoelectric actuator.

A lead electrode 90, which is a wiring layer 190 consisting of an adhesion layer 91 and a metal layer 92, is connected to the upper electrode film 80 of each piezoelectric element 300. Voltage is selectively applied to each piezoelectric element 300 via the lead electrode 90. The wiring layer 190, which consists of the same layers as those of the lead electrode 90, i.e., adhesion layer 91 and metal layer 92, is also present on the insulation film 51 in a region corresponding to an opening peripheral edge zone of the communicating portion 13.

The reservoir forming plate 30, which has the reservoir portion 31 constituting at least a part of the reservoir 100, is bonded onto a surface of the passage-forming substrate 10 where the piezoelectric elements 300 have been formed. In the present embodiment, the passage-forming substrate 10 and the reservoir forming plate 30 are bonded together by use of an adhesive agent 35. The reservoir portion 31 of the reservoir forming plate 30 is brought into communication with the communicating portion 13 via a through-hole 52 provided in the elastic film 50 and the insulation film 51, and the reservoir portion 31 and the communicating portion 13 constitute the reservoir 100.

In a region of the reservoir forming plate 30 opposed to the piezoelectric elements 300, there is provided a piezoelectric element holding portion 32. Since the piezoelectric elements 300 are formed within the piezoelectric element holding portion 32, they are protected in a state in which they are substantially free from the influence of an external environment. The piezoelectric element holding portion 32 may be, or need not be, sealed. The material for the reservoir forming plate 30 of such a configuration is, for example, glass, a ceramic material, a metal, or a resin. Preferably, the reservoir forming plate 30 is formed of a material having nearly the same thermal expansion coefficient as that of the passage-forming substrate 10. In the present embodiment, the reservoir forming plate 30 is formed from a single crystal silicon substrate which is the same material as that for the passage-forming substrate 10.

A connection wiring 200 formed in a predetermined pattern is provided on the reservoir forming plate 30, and a drive IC 210 for driving the piezoelectric elements 300 is mounted on the connection wiring 200. A front end portion of each lead electrode 90 led from each piezoelectric element 300 outwardly of the piezoelectric element holding portion 32 is electrically connected to the drive IC 210 via a drive wiring 220.

Furthermore, a compliance plate 40, which consists of a sealing film 41 and a fixing plate 42, is bonded onto a region of the reservoir forming plate 30 corresponding to the reservoir portion 31. The sealing film 41 comprises a low rigidity, flexible material (for example, a polyphenylene sulfide (PPS) film of 6 μm in thickness), and the sealing film 41 seals one surface of the reservoir portion 31. The fixing plate 42 is formed from a hard material such as a metal (for example, stainless steel (SUS) of 30 μm in thickness). A region of the fixing plate 42 opposed to the reservoir 100 defines an opening portion 43 completely deprived of the plate in the thickness direction. Thus, one surface of the reservoir 100 is sealed only with the sealing film 41 having flexibility.

With the ink-jet recording head of the present embodiment described above, ink is taken in from external ink supply means (not shown), and the interior of the head ranging from the reservoir 100 to the nozzle orifices 21 is filled with the ink.

Then, according to recording signals from the drive IC 210, voltage is applied between the lower electrode film 60 and the upper electrode film 80 corresponding to the pressure generating chamber 12 to warp and deform the piezoelectric element 300 and the vibration plate. As a result, the pressure inside the pressure generating chamber 12 rises to eject ink through the nozzle orifice 21.

The method for producing the above-mentioned ink-jet recording head will be described with reference to FIGS. 3A to 3B through FIGS. 7A and 7B. These drawings are sectional views in the longitudinal direction of the pressure generating chamber, showing the manufacturing method for the ink-jet recording head.

Figure 3A:
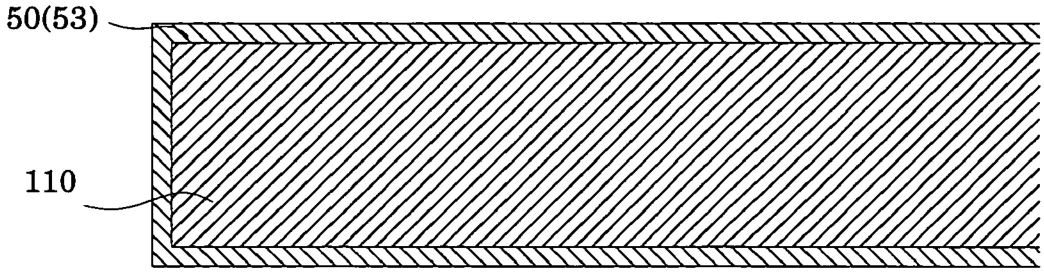
FIGS. 3A to 3C are sectional views showing steps in a manufacturing process for the recording head according to Embodiment 1.

Firstly, as shown in FIG. 3A, a passage-forming substrate wafer 110, which is a silicon wafer, is thermally oxidized in a diffusion furnace at about 1,100° C. to form a silicon dioxide film 53 constituting the elastic film 50 on the surface of the wafer 110. In the present embodiment, a silicon wafer having a relatively large thickness of about 625 μm and having high rigidity is used as the passage-forming substrate wafer 110.

Figure 3B:
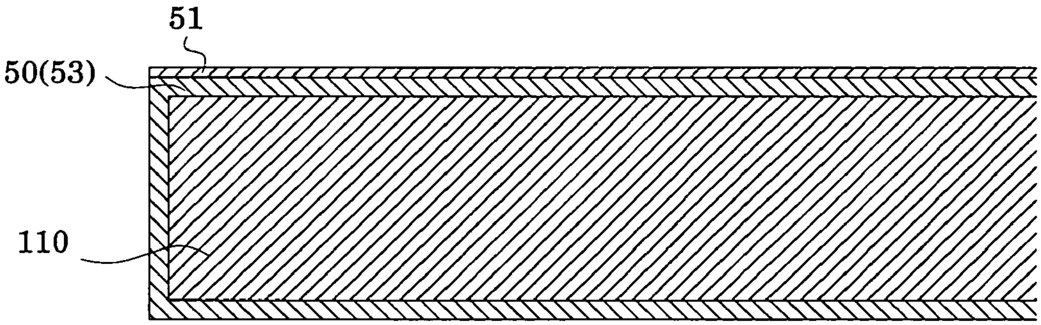

Then, as shown in FIG. 3B, the insulation film 51 comprising zirconium oxide is formed on the elastic film 50 (silicon dioxide film 53). Concretely, a zirconium (Zr) layer is formed on the elastic film 50 (silicon dioxide film 53), for example, by sputtering. Then, the zirconium layer is thermally oxidized, for example, in a diffusion furnace at 500 to 1,200° C. to form the insulation film 51 comprising zirconium oxide ($ZrO_2$).

Figure 3C:
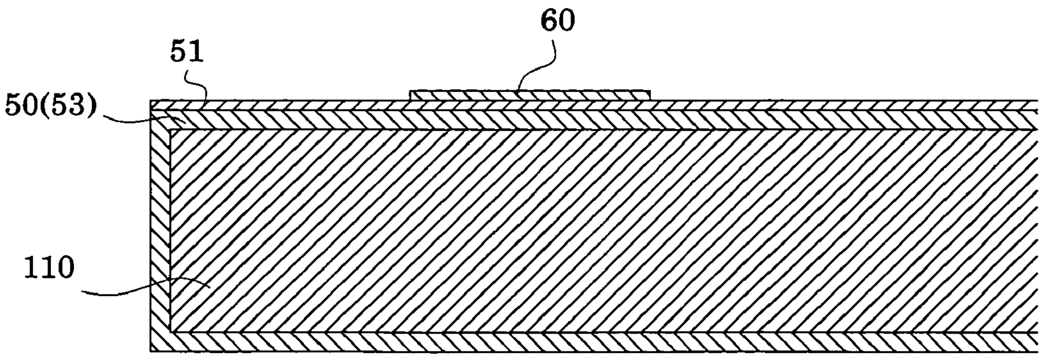
Figure 4A:
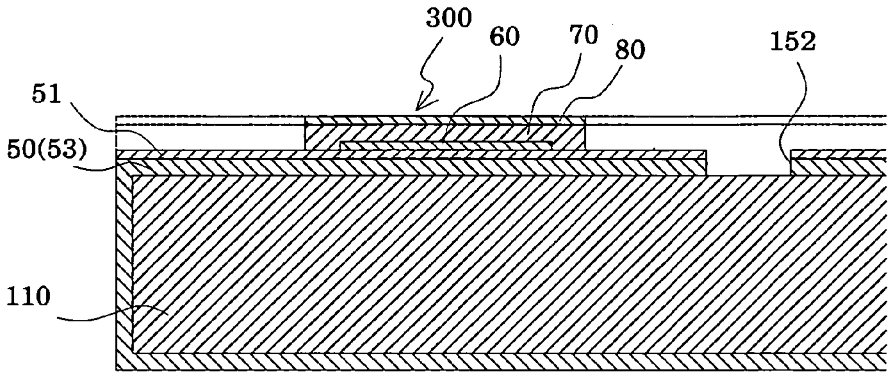
FIGS. 4A to 4C are sectional views showing the steps in the manufacturing process for the recording head according to Embodiment 1.

Then, as shown in FIG. 3C, platinum and iridium, for example, are stacked on the insulation film 51 to form the lower electrode film 60, whereafter the lower electrode film 60 is patterned into a predetermined shape. Then, as shown in FIG. 4A, the piezoelectric layer 70 comprising, for example, lead zirconate titanate (PZT), and the upper electrode film 80 comprising, for example, iridium, are formed on the entire surface of the passage-forming substrate wafer 110, where after the piezoelectric layer 70 and the upper electrode film 80 are patterned in a region opposed to the respective pressure generating chambers 12 to form the piezoelectric elements 300. After formation of the piezoelectric elements 300, the insulation film 51 and the elastic film 50 are patterned to form an exposed portion 152 in a region where the communicating portion (not shown) of the passage-forming substrate wafer 110 is to be formed. The exposed portion 152 penetrates the insulation film 51 and the elastic film 50, leaving the surface of the passage-forming substrate wafer 110 exposed.

The material for the piezoelectric layer 70 constituting the piezoelectric element 300 is, for example, a ferroelectric piezoelectric material such as lead zirconate titanate (PZT), or a relaxor ferroelectric having a metal, such as niobium, nickel, magnesium, bismuth or yttrium, added to such a ferroelectric piezoelectric material. The composition of the piezoelectric layer 70 may be chosen, as appropriate, in consideration of the characteristics, uses, etc. of the piezoelectric element 300. Its examples are $PbTiO_3$ (PT), $PbZrO_3$ (PZ), $Pb(Zr_xTi_{1-x})O_3$ (PZT), $Pb(Mg_{1/3}Nb_{2/3})O_3$—$PbTiO_3$ (PMN—PT), $Pb(Zn_{1/3}Nb_{2/3})O_3$—$PbTiO_3$ (PZN—PT), $Pb(Ni_{1/3}Nb_{2/3})O_3$—$PbTiO_3$ (PNN—PT), $Pb(In_{1/2}Nb_{1/2})O_3$—$PbTiO_3$ (PIN—PT) $Pb(Sc_{1/2}Ta_{1/2})O_3$—$PbTiO_3$ (PST-PT), $Pb(Sc_{1/2}Nb_{1/2})O_3$—$PbTiO_3$ (PSN—PT), $BiScO_3$—$PbTiO_3$ (BS—PT), and $BiYbO_3$—$PbTiO_3$ (BY—PT)

The method for forming the piezoelectric layer 70 is not limited. In the present embodiment, for example, the piezoelectric layer 70 is formed by the so-called sol-gel process which comprises dissolving or dispersing metal organic materials in a catalyst to form a sol, coating and drying the sol to form a gel, and firing the gel at a high temperature to obtain the piezoelectric layer 70 comprising the metal oxide.

Figure 4B:
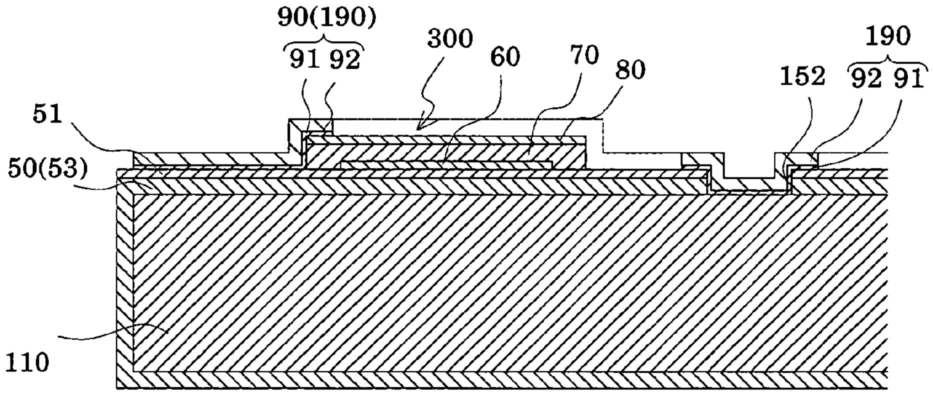

Then, as shown in FIG. 4B, the lead electrode 90 is formed. Concretely, the metal layer 92 is formed via the adhesion layer 91 for ensuring adhesion, whereby the wiring layer 190 consisting of the adhesion layer 91 and the metal layer 92 is formed on the entire surface of the passage-forming substrate wafer 110. At this time, the wiring layer 190 is formed even on the passage-forming substrate wafer 110 in the exposed portion 152, so that the exposed portion 152 is sealed with the wiring layer 190. A mask pattern (not shown) comprising, for example, a resist is formed on the wiring layer 190. The metal layer 92 and the adhesion layer 91 are patterned via this mask pattern for each of the piezoelectric elements 300 to form the lead electrode 90. The wiring layer 190 provided within the exposed portion 152 on the passage-forming substrate wafer 110 is retained in a form discontinuous with the lead electrode 90.

The main material for the metal layer 92 constituting the lead electrode 90 is not limited, if it is a material having relatively high electrical conductivity. Its examples include gold (Au) aluminum (Al) and copper (Cu), and gold (Au) is used in the present embodiment. The material for the adhesion layer 91 may be a material which can ensure adhesion of the metal layer 92. Concretely, titanium (Ti), titanium-tungsten compounds (TiW), nickel (Ni), chromium (Cr), and nickel-chromium compounds (NiCr) are named. In the present embodiment, titanium-tungsten compounds (TiW) are used.

Figure 4C:
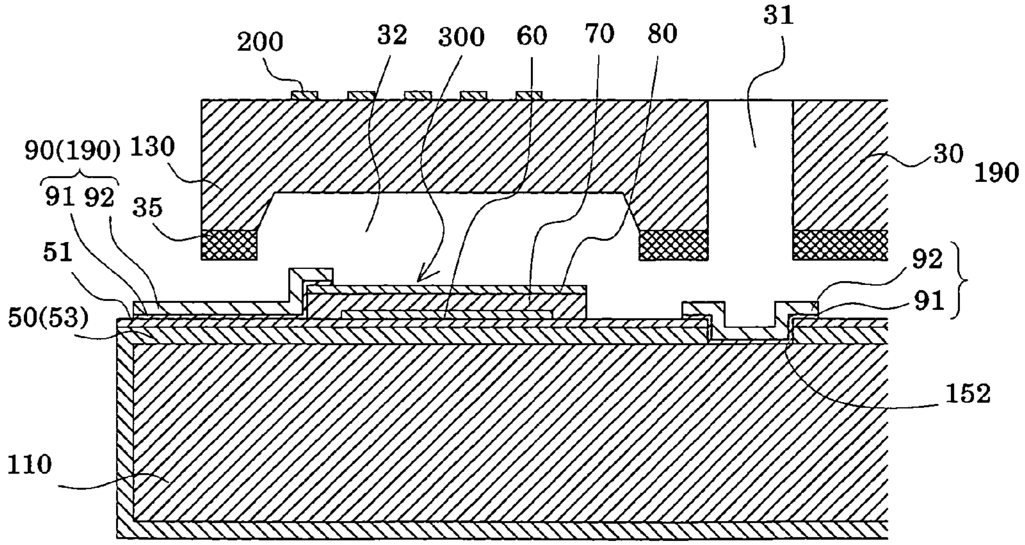

Then, as shown in FIG. 4C, a reservoir forming plate wafer 130 is adhered onto the passage-forming substrate wafer 110 by the adhesive agent 35. The reservoir forming plate wafer 130 has the reservoir portion 31 and the piezoelectric element holding portion 32 formed therein beforehand, and the aforementioned connection wiring 200 has been formed in advance on the reservoir forming plate wafer 130. The reservoir forming plate wafer 130 is, for example, a silicon wafer having a thickness of the order of 400 μm, and the rigidity of the passage-forming substrate wafer 110 is markedly increased by bonding the reservoir forming plate wafer 130 thereto.

Figure 5A:
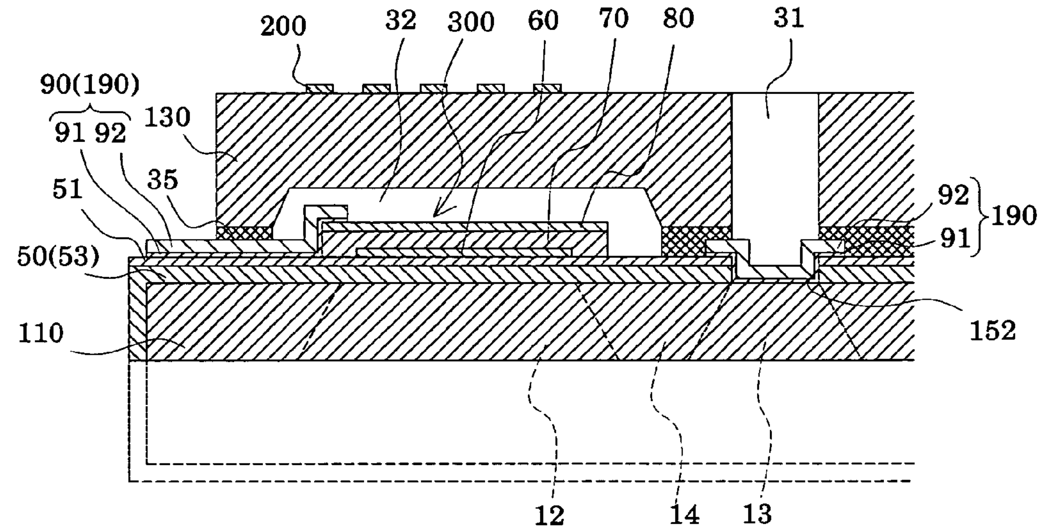
FIGS. 5A to 5C are sectional views showing the steps in the manufacturing process for the recording head according to Embodiment 1.
Figure 5B:
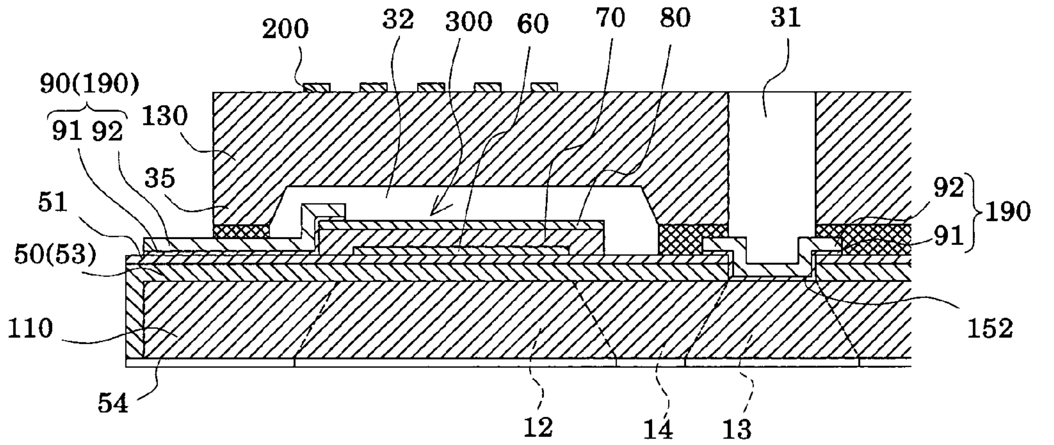
Figure 5C:
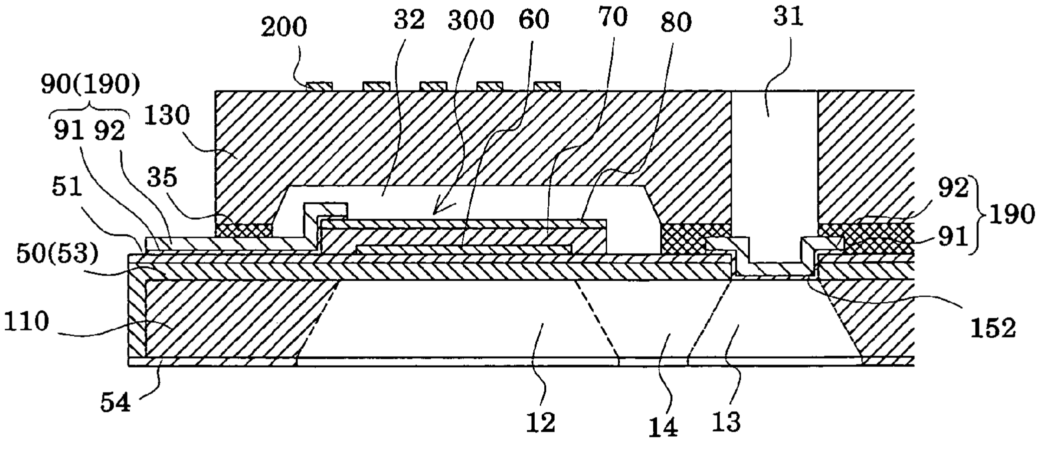

Then, as shown in FIG. 5A, the passage-forming substrate wafer 110 is polished to a certain thickness, and then is wet-etched with fluoronitric acid to bring the passage-forming substrate wafer 110 into a predetermined thickness. In the present embodiment, for example, the passage-forming substrate wafer 110 is processed by polishing and wet etching to have a thickness of about 70 μm. Then, as shown in FIG. 5B, a mask film 54 comprising, for example, silicon nitride (SiN) is formed anew on the passage-forming substrate wafer 110, and is patterned into a predetermined shape. Then, as shown in FIG. 5C, the passage-forming substrate wafer 110 is subjected to anisotropic etching (wet etching) via the mask film 54 to form the pressure generating chambers 12, the communicating portion 13 and the ink supply paths 14 in the passage-forming substrate wafer 110. Concretely, the passage-forming substrate wafer 110 is etched with an etching solution, such as an aqueous solution of potassium hydroxide (KOH) until the elastic film 50 and the adhesion layer 91 (metal layer 92) become exposed. By this procedure, the pressure generating chambers 12, the communicating portion 13 and the ink supply paths 14 are formed simultaneously.

At this time, the etching solution does not flow into the reservoir forming plate wafer 130 via the exposed portion 152, since the exposed portion 152 is sealed with the wiring layer 190 consisting of the adhesion layer 91 and the metal layer 92. Thus, the etching solution does not stick to the connection wiring 200 provided on the surface of the reservoir forming plate wafer 130, and trouble such as a break in wiring can be prevented. Nor is there a possibility that the reservoir forming plate wafer 130 will be etched because of entry of the etching solution into the reservoir portion 31.

In forming the pressure generating chambers 12, the surface of the reservoir forming plate wafer 130 opposite to the passage-forming substrate wafer 110 may be further sealed with a material having alkali resistance, for example, a sealing film comprising PPS (polyphenylene sulfide) or PPTA (poly-paraphenylene terephthalamide). By so doing, a trouble, such as a break in the wiring provided on the reservoir forming plate wafer 130, can be prevented more reliably.

Figure 6A:
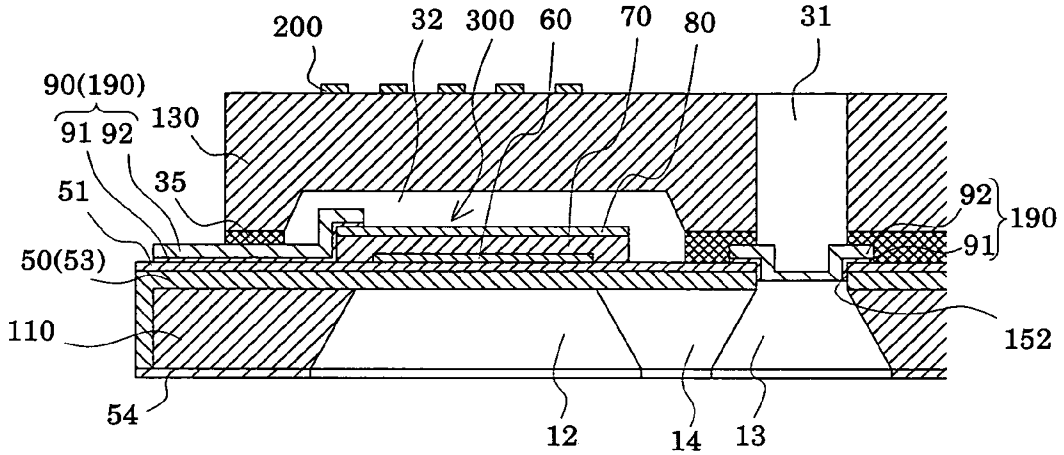
FIGS. 6A to 6C are sectional views showing the steps in the manufacturing process for the recording head according to Embodiment 1.

Then, as shown in FIG. 6A, a part of the wiring layer 190 within the exposed portion 152 is removed by wet etching (light etching) performed on the side of the communicating portion 13. That is, the adhesion layer 91 exposed to the communicating portion 13, and the metal layer 92, where the adhesion layer 91 has been diffused, are partly removed by light etching. By this operation, adhesion between the protective film 15, which is to be formed on the wiring layer 190 by a subsequent step, and the wiring layer 190 is weakened to make it easier for the protective film 15 to be peeled from the wiring layer 190.

Figure 6B:
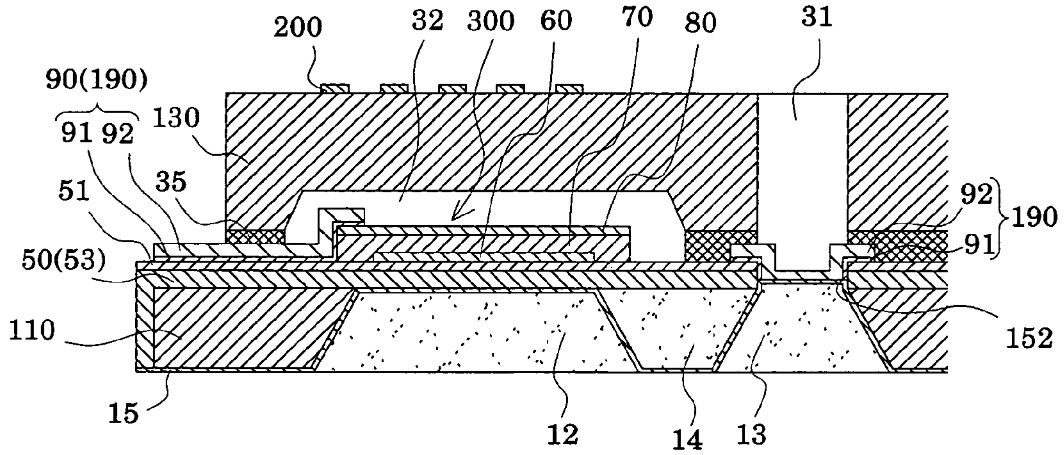

Then, the mask film 54 on the surface of the passage-forming substrate wafer 110 is removed and, as shown in FIG. 6B, a material having liquid resistance (ink resistance), for example, the protective film 15 comprising tantalum pentoxide, is formed, for example, by the CVD process. At this time, the exposed portion 152 is sealed with the wiring layer 190, so that the protective film 15 is not formed, for example, on the outer surface of the reservoir forming plate wafer 130 via the exposed portion 152. Accordingly, the protective film 15 is not formed, for example, on the connection wiring 200 provided on the surface of the reservoir forming plate wafer 130. Consequently, a trouble, such as wrong connection of the drive IC 210 or the like, can be prevented, and the step of removing a surplus protective film 15 becomes unnecessary, thereby simplifying the manufacturing process and reducing the manufacturing cost.

Figure 6C:
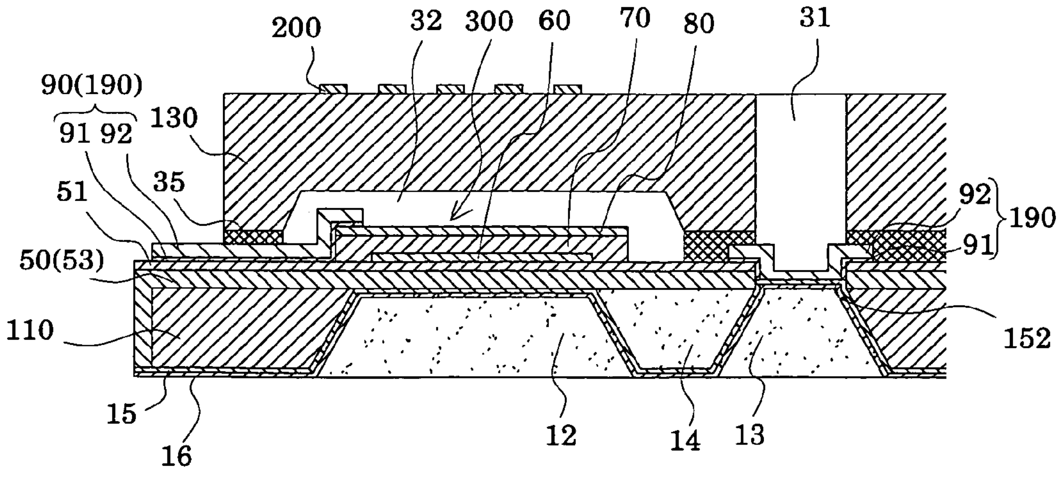
Figure 7A:
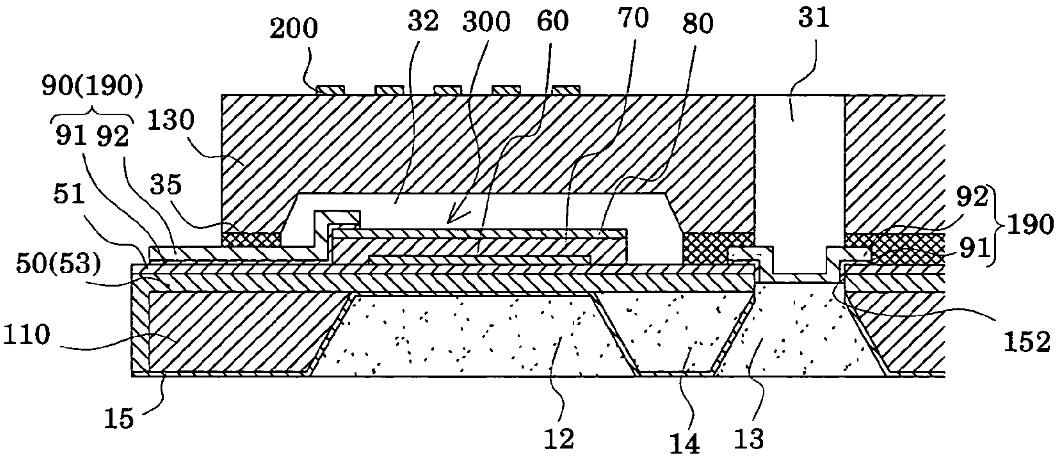
FIGS. 7A and 7B are sectional views showing the steps in the manufacturing process for the recording head according to Embodiment 1.

Then, as shown in FIG. 6C, a release layer 16 comprising a high stress material is formed on the protective film 15, for example, by the CVD process. The release layer 16 comprises an oxide or a nitride, and its stress peels the protective film 15 on the wiring layer 190 from the wiring layer 190. For this purpose, the release layer 16 has internal stress which is preferably compressive stress, and the preferred stress is 80 MPa or more. The release layer 16 preferably uses a material whose adhesion to the protective film 15 is greater than the adhesion between the protective film 15 and the wiring layer 190. In the present embodiment, a titanium-tungsten compound (TiW) is used as the release layer 16. Since the release layer 16 comprising the high stress material and having high adhesion to the protective film 15 is thus formed on the protective film 15, the protective film 15 formed on the wiring layer 190 begins to peel off under the stress of the release layer 16. The release layer 16 is removed by wet etching, whereby the protective film 15 on the wiring layer 190 is completely removed together with the release layer 16, as shown in FIG. 7A. In the present embodiment, part of the wiring layer 190, on the side of the communicating portion 13, provided in the exposed portion 152, namely, part of the adhesion layer 91 and the metal layer 92 where the adhesion layer 91 has been diffused, has been removed by the aforementioned step. Thus, the adhesion between the wiring layer 190 and the protective film 15 is so weak that the protective film 15 can be easily peeled from the wiring layer 190.

Figure 7B:
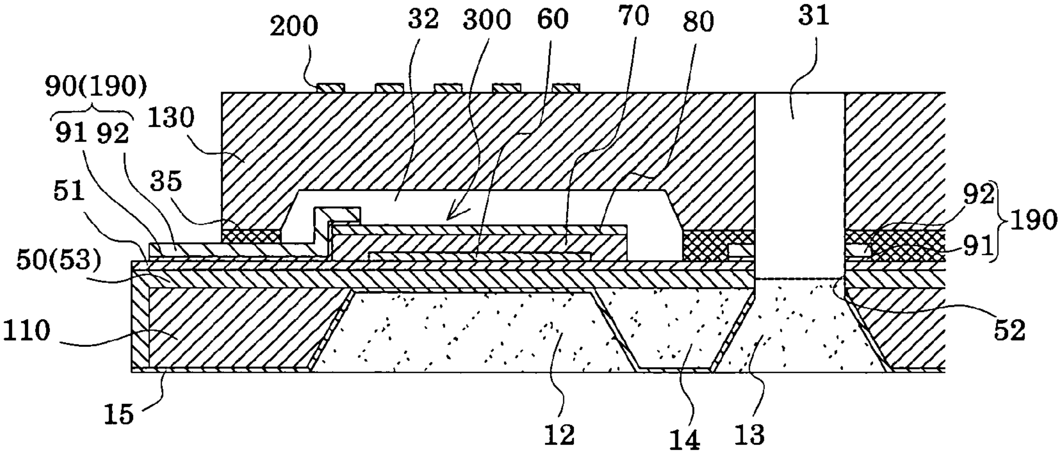

Then, as shown in FIG. 7B, the wiring layer 190 is removed by wet etching performed on the side of the communicating portion 13 to form the through-hole 52. At this time, the protective film 15 is not present on the wiring layer 190, so that the protective film 15 does not impede the wet etching of the wiring layer 190, and the through-hole 52 can be formed easily by the wet etching.

If the reservoir 100 is formed by the above-described method, it follows that the protective film 15 has not been formed on the surface of the wiring layer 190 which is exposed into the reservoir 100. Thus, the wiring layer 190 is likely to be eroded by ink. However, the amount of possible erosion is very small, and poses no problem to the life of the head. Besides, a silicon dioxide film has been formed on the inner surface of the reservoir portion 31 by thermal oxidation of the reservoir forming plate wafer 130, although this silicon dioxide film is not shown. Thus, there is no need to provide the protective film 15 there.

After the reservoir 100 has thus been formed, the drive IC 210 is mounted on the connection wiring 200 formed on the reservoir forming plate wafer 130, and the drive IC 210 and the lead electrodes 90 are connected by the drive wirings 220 (see FIG. 2B). Then, unnecessary regions of the outer peripheral edge portions of the passage-forming substrate wafer 110 and the reservoir forming plate wafer 130 are removed, for example, by cutting by means of dicing. Then, the nozzle plate 20 having the nozzle orifices 21 bored therein is bonded to the surface of the passage-forming substrate wafer 110 opposite to the reservoir forming plate wafer 130, and the compliance plate 40 is bonded to the reservoir forming plate wafer 130. The passage-forming substrate wafer 110 including the other members is divided into the passage-forming substrate 10, etc. of one-chip size as shown in FIG. 1 to produce the ink-jet recording head of the above-described structure.

In the present embodiment, as described above, the wiring layer 190, which is the same layer as the lead electrode 90, is formed on the passage-forming substrate wafer 110 within the exposed portion 152, whereby the exposed portion 152 is sealed with the wiring layer 190. The wiring layer 190 is finally removed by etching to establish communication between the reservoir portion 31 and the communicating portion 13. Thus, foreign matter, such as processing swarf, does not occur, unlike conventional machining or mechanical processing. Consequently, the events such as processing swarf remaining in the ink passages, such as the pressure generating chambers 12 and the communicating portion 13, and the remaining processing swarf causing ejection failure due to nozzle clogging or the like can be prevented reliably.

Moreover, the protective film 15 is formed before the formation of the through-hole 52 bringing the communicating portion 13 and the reservoir portion 31 into communication. Thus, the protective film 15 is not formed, for example, on the connection wiring 200 laid on the reservoir forming plate wafer 130. As a result, there is no need for removal of a surplus protective film 15 on the connection wiring 200, etc., and the drive IC 210 can be reliably connected to the connection wiring 200.

Furthermore, the protective film 15 on the wiring layer 190 is removed before the formation of the through-hole 52. Thus, the protective film 15 does not impede the wet etching of the wiring layer 190, and the through-hole 52 can be formed easily.

Other Embodiments

Although the embodiment of the present invention has been described above, the present invention is not limited to this embodiment. For example, in the above-described embodiment, the wiring layer 190 composed of the adhesion layer 91 and the metal layer 92 is formed, but it is not limitative. For example, the wiring layer may be composed of the metal layer alone. In the above embodiment, moreover, the protective film 15 on the wiring layer 190 formed within the exposed portion 152 is removed by the release layer 16 of the high stress material. However, the method of removing the protective film 15 on the wiring layer 190 is not limited to this method.

Furthermore, in the above-described embodiment, the ink-jet recording head is taken for illustration as an example of the liquid-jet head. However, the present invention widely targets liquid-jet heads in general and, needless to say, can be applied to methods for producing liquid-jet heads for jetting liquids other than ink. Other liquid-jet heads include, for example, various recording heads for use in image recording devices such as printers, color material jet heads for use in the production of color filters such as liquid crystal displays, electrode material jet heads for use in the formation of electrodes for organic EL displays and FED (face emitting displays), and bio-organic material jet heads for use in the production of biochips. It should be understood that such changes, substitutions and alterations can be made therein without departing from the spirit and scope of the invention as defined by the appended claims.

What is claimed is:

1. A method for producing a liquid-jet head, comprising the steps of:

forming piezoelectric elements, each of which comprises of a first electrode, a piezoelectric layer, and a second electrode, on a passage-forming substrate via a vibration plate, the passage-forming substrate being to have, formed therein, pressure generating chambers communicating with nozzle orifices for ejection of a liquid, and a communicating portion communicating with the pressure generating chambers, and removing the vibration plate in a region for serving as the communicating portion to form an exposed portion where the surface of the passage-forming substrate is exposed;

forming a wiring layer on the surface of the passage-forming substrate on a side of the piezoelectric elements, also forming the wiring layer on the passage-forming substrate within the exposed portion, and patterning the wiring layer in a region corresponding to the piezoelectric elements to form lead electrodes leading from the piezoelectric elements;

bonding a reservoir forming plate to the passage-forming substrate, the reservoir forming plate having, formed therein, a reservoir portion communicating with the communicating portion and constituting a part of a reservoir;

wet-etching the passage-forming substrate at another surface thereof until the vibration plate and the wiring layer within the exposed portion are exposed to form the pressure generating chambers and the communicating portion;

forming a protective film comprising a material having liquid resistance on inner surfaces of the pressure generating chambers and the communicating portion;

removing the protective film provided on the wiring layer within the exposed portion; and performing wet etching on a side of the communicating portion to remove the wiring layer, thereby establishing communication between the reservoir portion and the communicating portion.

2. The method for producing a liquid-jet head according to claim 1, wherein in the step of removing the protective film, a release layer whose internal stress is compressive stress is formed on the protective film, and the release layer is removed, whereby the protective film provided on the wiring layer within the exposed portion is removed.

3. The method for producing a liquid-jet head according to claim 2, wherein the internal stress of the release layer is 80 MPa or more.

4. The method for producing a liquid-jet head according to claim 2, wherein adhesion between the release layer and the protective film is greater than adhesion between the protective film and the wiring layer.

5. The method for producing a liquid-jet head according to claim 2, wherein titanium-tungsten (TiW) is used as a material for the release layer.

6. The method for producing a liquid-jet head according to claim 1, wherein gold (Au) is used as a material for the wiring layer.

7. The method for producing a liquid-jet head according to claim 1, wherein the wiring layer is composed of an adhesion layer and a metal layer formed via the adhesion layer.

8. The method for producing a liquid-jet head according to claim 7, further comprising a step of light-etching a surface of the wiring layer exposed to the communicating portion before the step of forming the protective film.

9. The method for producing a liquid-jet head according to claim 1, wherein an oxide or a nitride is used as a material for the protective film.

10. The method for producing a liquid-jet head according to claim 1, wherein tantalum oxide is used as a material for the protective film.

* * * * *